(12) United States Patent
Colino Vega (10) Patent No.: US 10,683,671 B2
(45) Date of Patent: Jun. 16, 2020

(54) VERTICAL FORMWORK WITH TIE ROD AND TIE ROD ANCHOR

(71) Applicant: ULMA C y E, S. Coop., Oñati (ES)

(72) Inventor: Manuel Colino Vega, Vitoria-Gasteiz (ES)

(73) Assignee: ULMA C Y E, S. COOP., Oñati (ES)

(*) Notice: Subject to any disclaimer, the term of this patent is extended or adjusted under 35 U.S.C. 154(b) by 0 days.

(21) Appl. No.: 16/591,024

(22) Filed: Oct. 2, 2019

(65) Prior Publication Data

US 2020/0032533 A1 Jan. 30, 2020

Related U.S. Application Data

(63) Continuation of application No. PCT/ES2018/070259, filed on Mar. 27, 2018.

(30) Foreign Application Priority Data

Apr. 6, 2017 (EP) .................................. 17382182

(51) Int. Cl.
E04G 17/065 (2006.01)

(52) U.S. Cl.
CPC ..... *E04G 17/0652* (2013.01); *E04G 17/0657* (2013.01)

(58) Field of Classification Search
CPC ... E04G 17/06; E04G 17/065; E04G 17/0651; E04G 17/0652; E04G 17/0654;
(Continued)

(56) References Cited

U.S. PATENT DOCUMENTS 1,850,402 A * 3/1932 Lampert ............. E04G 17/0742
249/219.1
1,935,218 A * 11/1933 Umbach ............. E04G 17/0658
249/190
(Continued)

FOREIGN PATENT DOCUMENTS

DE 2744665 A1 4/1979
DE 3005319 A1 8/1981
(Continued)

OTHER PUBLICATIONS

International Search Report and Written Opinion in corresponding International Application No. PCT/ES2018/070259, dated Aug. 20, 2018, 11 pages.
(Continued)

*Primary Examiner* — Michael Safavi
(74) *Attorney, Agent, or Firm* — Edell, Shapiro & Finnan, LLC (57) ABSTRACT

According to one embodiment a vertical formwork is provided that includes at least one front formwork panel and one rear formwork panel that are arranged facing one another. The vertical form work also includes a rear anchor fixed to the rear panel, a front anchor fixed to the front formwork panel, and one tie rod (6) fixed to the front anchor and to the rear anchor. The rear anchor includes a support configured to be fixed to the rear formwork panel, and a nut coupled to said support. The nut includes a threaded hole configured for housing the threaded end of a tie rod. The threaded hole of the nut includes a first segment with an internal thread with a first core diameter and a second segment with an internal thread with a second core diameter, the first core diameter being greater than the second core diameter.

15 Claims, 9 Drawing Sheets

(58) Field of Classification Search
CPC ............ E04G 17/0655; E04G 17/0657; E04G 17/0658; F16B 21/02; F16B 43/001
USPC .............................................. 249/40, 42, 43
See application file for complete search history.

(56) References Cited

U.S. PATENT DOCUMENTS

| | | | | |
|---|---|---|---|---|
| 2,001,052 A * | 5/1935 | Colt | .................... | E04G 17/0742 249/217 |
| 2,002,526 A * | 5/1935 | Colt | .................... | E04G 17/0658 249/217 |
| 2,004,462 A * | 6/1935 | Bush | ........................ | E04G 11/12 249/42 |
| 2,069,085 A * | 1/1937 | Day | .................... | E04G 17/0652 249/42 |
| 2,116,597 A * | 5/1938 | Colt | .................... | E04G 17/0658 249/217 |
| 2,162,869 A * | 6/1939 | Symons | .............. | E04G 17/0658 249/42 |
| 2,270,035 A * | 1/1942 | Colt | .................... | E04G 17/0658 249/42 |
| 2,281,833 A * | 5/1942 | De Canio | ........... | E04G 17/0658 249/217 |
| 2,491,460 A * | 12/1949 | Turzillo | .............. | E04G 17/0658 249/42 |
| 2,502,672 A * | 4/1950 | Royther | .............. | E04G 17/0657 249/217 |
| 2,523,131 A * | 9/1950 | Martin | .................... | E04G 11/10 249/42 |
| 2,659,125 A * | 11/1953 | Williams | ............ | E04G 17/0658 249/42 |
| 3,168,772 A * | 2/1965 | Williams | ............ | E04G 17/0652 249/42 |
| 3,198,476 A * | 8/1965 | Smith | ................. | E04G 17/0752 249/42 |
| 3,292,893 A * | 12/1966 | Williams | ............ | E04G 17/0658 249/42 |
| 3,415,484 A * | 12/1968 | Klaiss | ................. | E04G 17/0658 249/216 |
| 3,667,720 A * | 6/1972 | Williams | ............ | E04G 17/0658 249/213 |
| 3,910,546 A * | 10/1975 | Connors | ............ | E04G 17/0721 249/40 |
| 3,981,476 A * | 9/1976 | Alexander | .......... | E04G 17/0658 249/42 |
| 4,044,986 A * | 8/1977 | Strickland | ........... | E04G 17/0657 249/216 |
| 6,935,607 B2 * | 8/2005 | Ward | .................... | E04G 17/045 249/190 |
| 8,220,772 B2 * | 7/2012 | Schwoerer | .......... | E04G 17/0657 249/40 |
| 2004/0079860 A1 * | 4/2004 | Ward | .................... | E04G 17/045 249/33 |
| 2008/0173788 A1 * | 7/2008 | Brewka | .................... | E04G 11/10 249/189 |
| 2012/0304570 A1 * | 12/2012 | Braun | ............ | E04G 17/0657 52/426 |
| 2014/0374568 A1 * | 12/2014 | Amon | ........................ | E04G 7/32 249/1 |
| 2015/0167329 A1 * | 6/2015 | Hagemes | ................ | E04G 11/08 52/745.21 |
| 2017/0002575 A1 * | 1/2017 | Dingier | .................... | E04G 17/14 |
| 2018/0320393 A1 * | 11/2018 | Dingier | .............. | E04G 17/0657 |

FOREIGN PATENT DOCUMENTS

| | | |
|---|---|---|
| DE | 29505507 U1 | 8/1996 |
| DE | 102010015582 A1 | 10/2011 |
| EP | 3385468 B1 | 10/2018 |
| FR | 2232217 A5 | 12/1974 |
| WO | 2008089737 A1 | 7/2008 |

OTHER PUBLICATIONS

Extended European Search Report in corresponding European Application No. 17382182.8, dated Sep. 12, 2017, 6 pages.

* cited by examiner

VERTICAL FORMWORK WITH TIE ROD AND TIE ROD ANCHOR

CROSS-REFERENCE TO RELATED APPLICATIONS

This application relates to and claims the benefit and priority to International Application No. PCT/ES2018/070259, filed Mar. 27, 2018, which relates to and claims the benefit and priority to European Application No. EP17382182.8, filed Apr. 6, 2017

TECHNICAL FIELD

The present invention relates to a vertical formwork.

BACKGROUND

Vertical formworks are known to be used for building vertical structures, such as walls, for example. A vertical formwork comprises two formwork panels which are arranged facing and fixed to one another by means of a tie rod, the tie rod being fixed to the formwork panels by means of an anchor fixed to the respective formwork panel.

The different components of the vertical formwork have to be configured for withstanding the concrete pressure to which they will be subjected. In particular, the tie rod used can have a larger or smaller core diameter, depending on the concrete pressure to be withstood, and accordingly the anchors whereby the tie rod is fixed to the formwork panels have to be adapted to the dimensions of the tie rod.

EP2126248A1 discloses a vertical formwork comprising a front formwork panel and a rear formwork panel which are arranged facing one another, a rear anchor fixed to the rear panel, a front anchor fixed to the front panel, and a tie rod fixed to the front anchor and to the rear anchor. The rear anchor comprises a support configured for being fixed to the rear formwork panel, and a nut coupled to said support such that the nut can be oriented with respect to said support.

DE102010015582A1, DE29505507U1, DE3005319A1, DE2744665A1 and FR2232217A5 disclose anchors comprising a support and a nut comprising a first threaded segment and a second threaded segment. The first threaded segment is configured for being coupled to a first element and the second threaded segment is configured for being coupled to a second element, so that both elements are coupled to each other by means of the nut.

SUMMARY

According to one embodiment, a vertical formwork is provided that comprises a front formwork panel and a rear formwork panel which are arranged facing one another, a rear anchor fixed to the rear panel, a front anchor fixed to the front panel, and a tie rod fixed to the front anchor and to the rear anchor.

The rear anchor comprises a support configured for being fixed to the rear formwork panel, and a nut coupled to said support such that the nut can be oriented with respect to said support.

The nut comprises a threaded hole configured for housing the threaded end of the tie rod. The threaded hole comprises a first segment with an internal thread with a first core diameter and a second segment with an internal thread with a second core diameter, the first core diameter being greater than the second core diameter.

The tie rod is selected from:

a first type of tie rod with a threaded end with an external thread configured for being fixed to the first segment of the threaded hole, said tie rod of the first type being screwed into the internal thread of the first segment, and a second type of tie rod with a threaded end with an external thread configured for being fixed to the second segment of the threaded hole, said tie rod of the second type going through the first segment and being screwed into the internal thread of the second segment.

Therefore, the fact that the nut of the rear anchor comprises a threaded hole with a first segment with an internal thread with a first core diameter and a second segment with an internal thread with a second core diameter, allows being able to use the two types of tie rods with one and the same rear anchor. That is particularly advantageous in vertical formworks for being adjusted from one face in which the rear anchor is fixed to the rear formwork panel before the formwork panels are arranged in the concreting position, since the operator can interchangeably screw in the threaded end of the tie rod with an external thread configured for being fixed to the first segment of the threaded hole, or a tie rod with an external thread configured for being fixed to the second segment of the threaded hole.

These and other advantages and features will become apparent in view of the drawings and detailed description.

DETAILED DESCRIPTION

Figure 1:
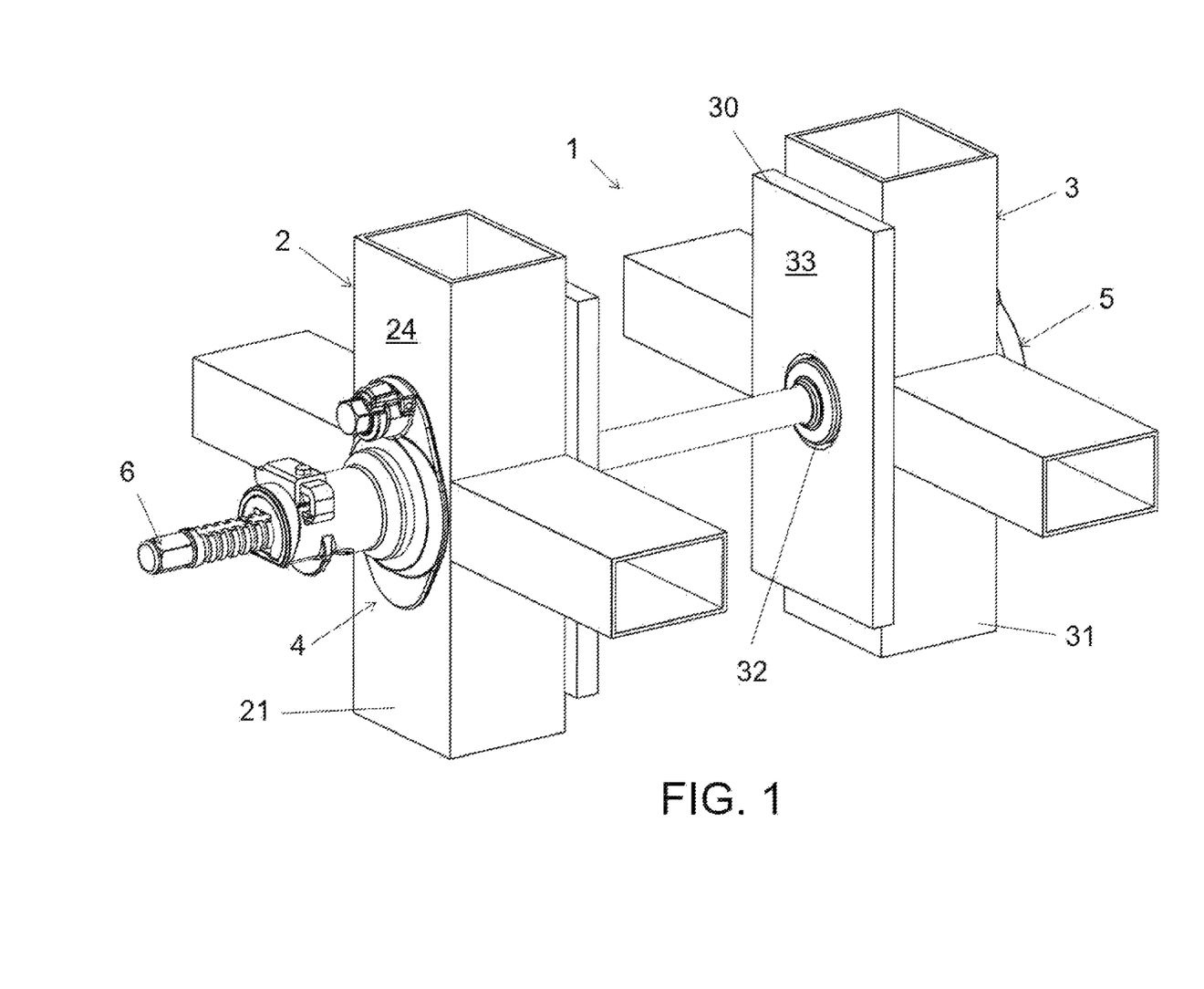
FIG. 1 shows a perspective view of a vertical formwork according to one embodiment.
Figure 2:
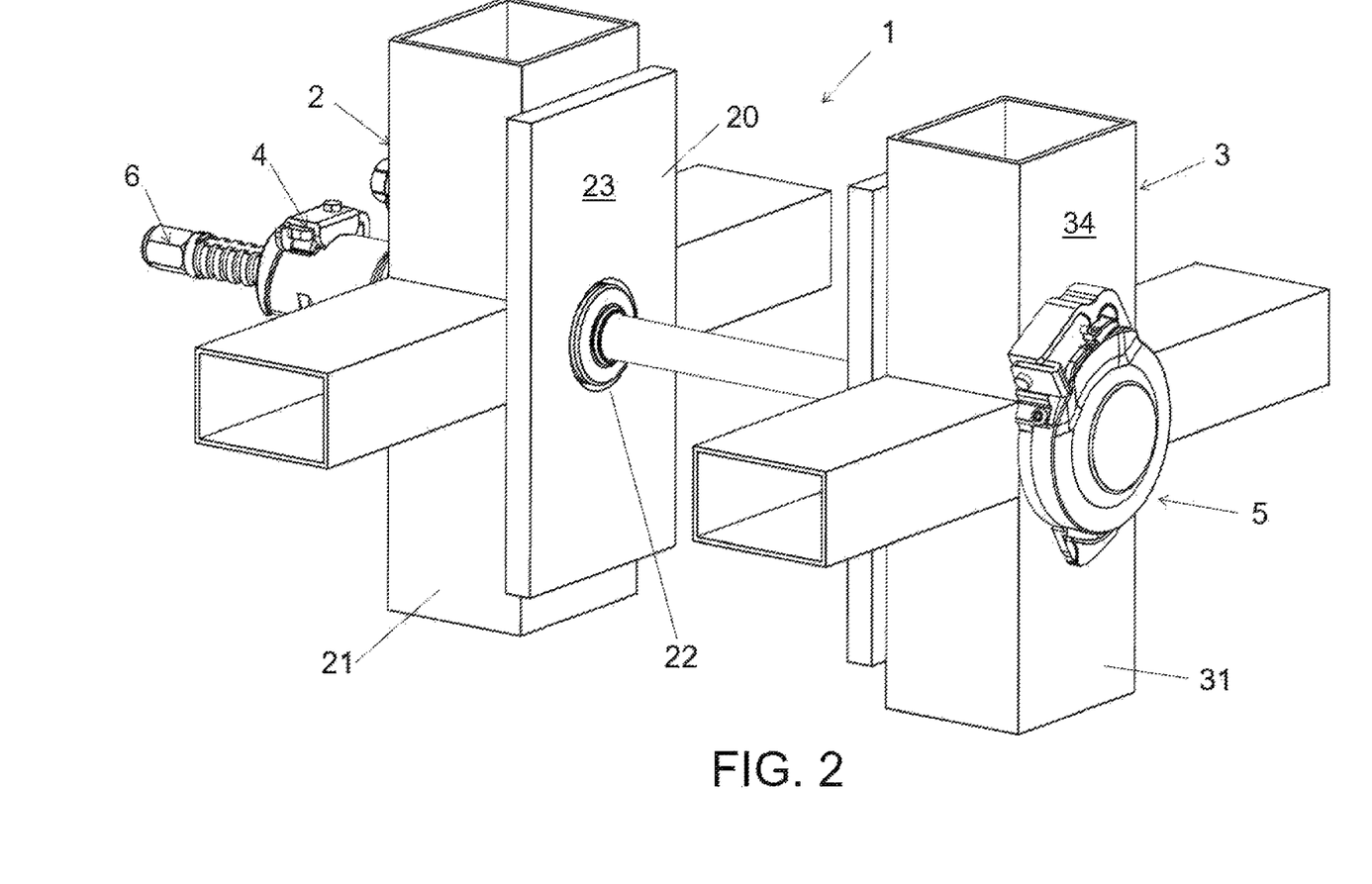
FIG. 2 shows a second perspective view of the vertical formwork of FIG. 1.
Figure 3:
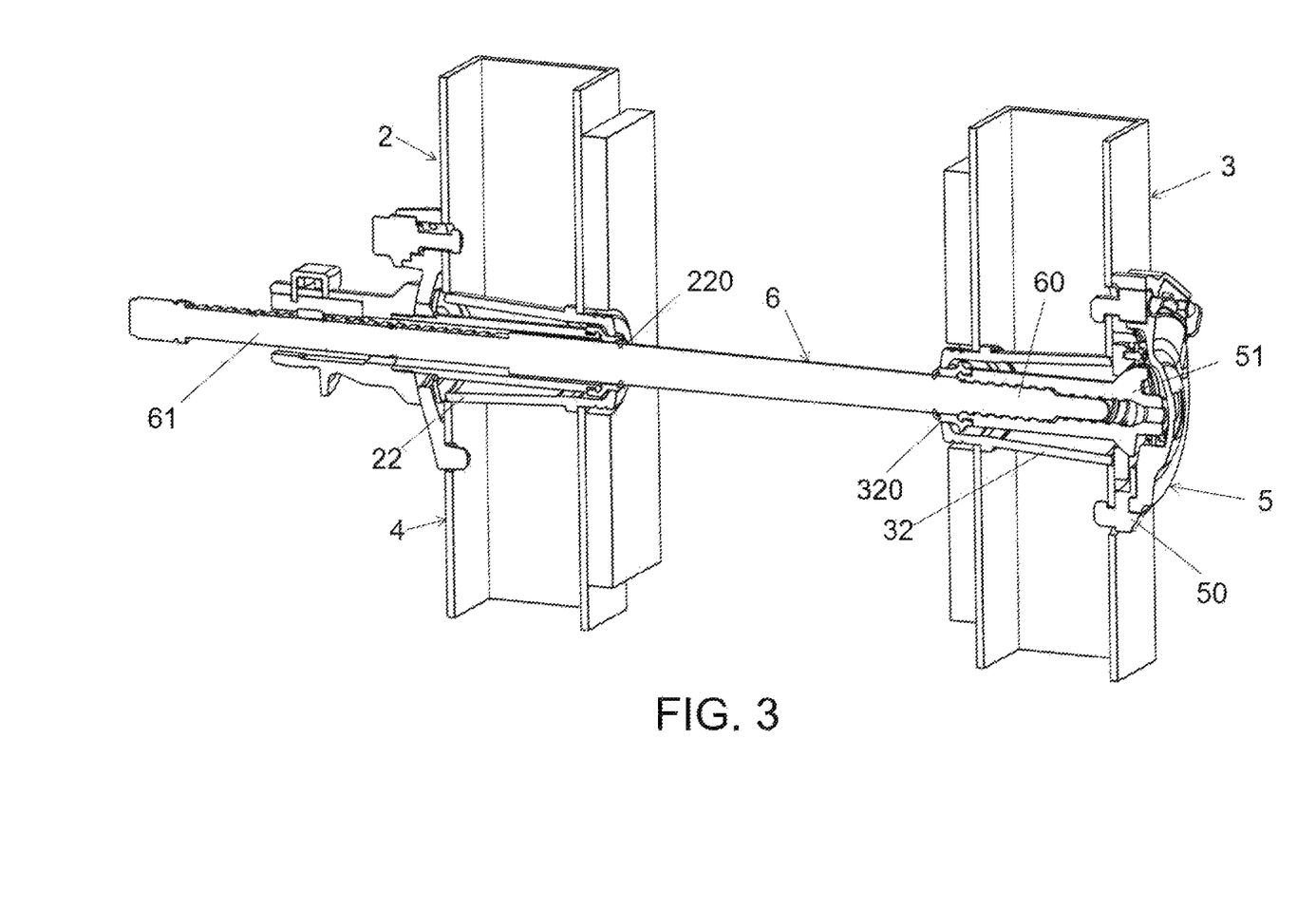
FIG. 3 shows a section view of the vertical formwork of FIG. 1.

According to one embodiment, the vertical formwork 1 comprises a front formwork panel 2 and a rear formwork panel 3 which are arranged facing one another. The vertical formwork 1 also comprises a front anchor 4 fixed to the front formwork panel 2, a rear anchor 5 fixed to the rear formwork panel 3, and a tie rod 6 with a threaded end 60 fixed to the rear anchor 5 and a first end 61 fixed to the front anchor 4.

The vertical formwork 1 of this embodiment is a vertical formwork 1 configured for being adjusted from one face, i.e., the tie rod 6 is fixed from one side of the vertical formwork 1. In vertical formworks 1 of this type, the rear anchor 5 is fixed to the rear formwork panel 3 before the front formwork panel 2 and the rear formwork panel 3 are arranged in the concreting position. Once the front formwork panel 2 and the rear formwork panel 3 are positioned in the concreting position, the operator is located in the front portion, fixing the threaded end 60 of the tie rod 6 to the rear anchor 5 and the first end 61 of the tie rod 6 to the front anchor 4 which is fixed to the front formwork panel 2. In the context of the invention, the front portion will be considered the portion where the operator fixing the tie rod 6 is located. Therefore, the front formwork panel 2 is the formwork panel arranged on the side of the operator and the rear formwork panel 3 is the formwork panel facing said front panel 2. Similarly, the front anchor 4 is the anchor fixed to the front formwork panel 2, and the rear anchor 5 is the anchor fixed to the rear formwork panel 3. Furthermore, the inner face 23 and 33 of the formwork panel 2 and 3 will be considered the face suitable for being arranged in contact with the concrete and the outer face 24 and 34 of the formwork panel 2 and 3 will be considered the face opposite the inner face 23 and 33.

In this embodiment, the rear formwork panel 3 comprises a structure 31, a board 30 fixed to said structure 31, and a housing extending from the outer face 34 to the inner face 33 in which a bushing 32 is arranged, said bushing 32 going through said structure 31 and said board 30. The bushing 32 forms a housing in which part of the rear anchor 3 is housed. The bushing 32 has an entry opening which is arranged at the same level as the outer face 34 of the rear formwork panel 3 and an exit opening 320 which is arranged at the same level as the inner face 33 of the formwork panel, the diameter of the exit opening 320 being less than the diameter of the entry opening. Preferably, the board 30 is made of wood or plastic and the structure 31 and the bushing 32 are made of metal.

In this embodiment, the configuration of the front formwork panel 2 is the same as the configuration of the rear formwork panel 3, and they can therefore be used interchangeably. For the sake of clarity, the formwork panels are only partially depicted in the drawings.

In other embodiments, depending on the dimensions of the formwork panel, each formwork panel can comprise a plurality of housings, a respective anchor and bushing being arranged in each of them, such that two facing formwork panels can be fixed to one another through a plurality of tie rods fixed to said anchors.

Figure 4:
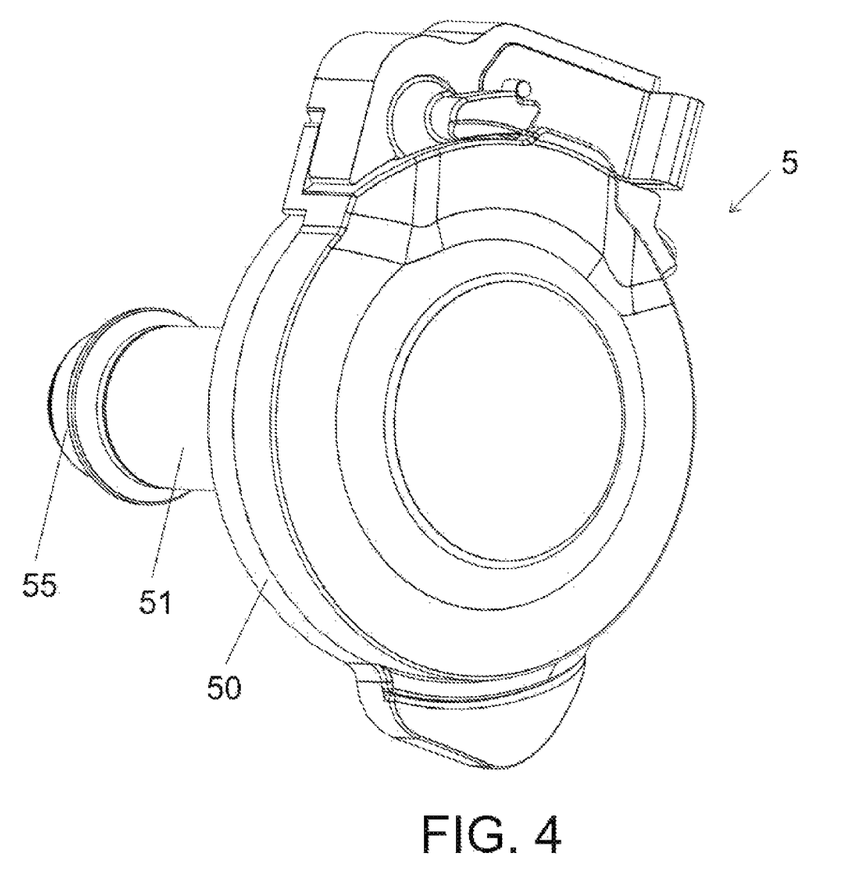
FIG. 4 shows a perspective view of the rear anchor of the vertical formwork of FIG. 1.
Figure 5:
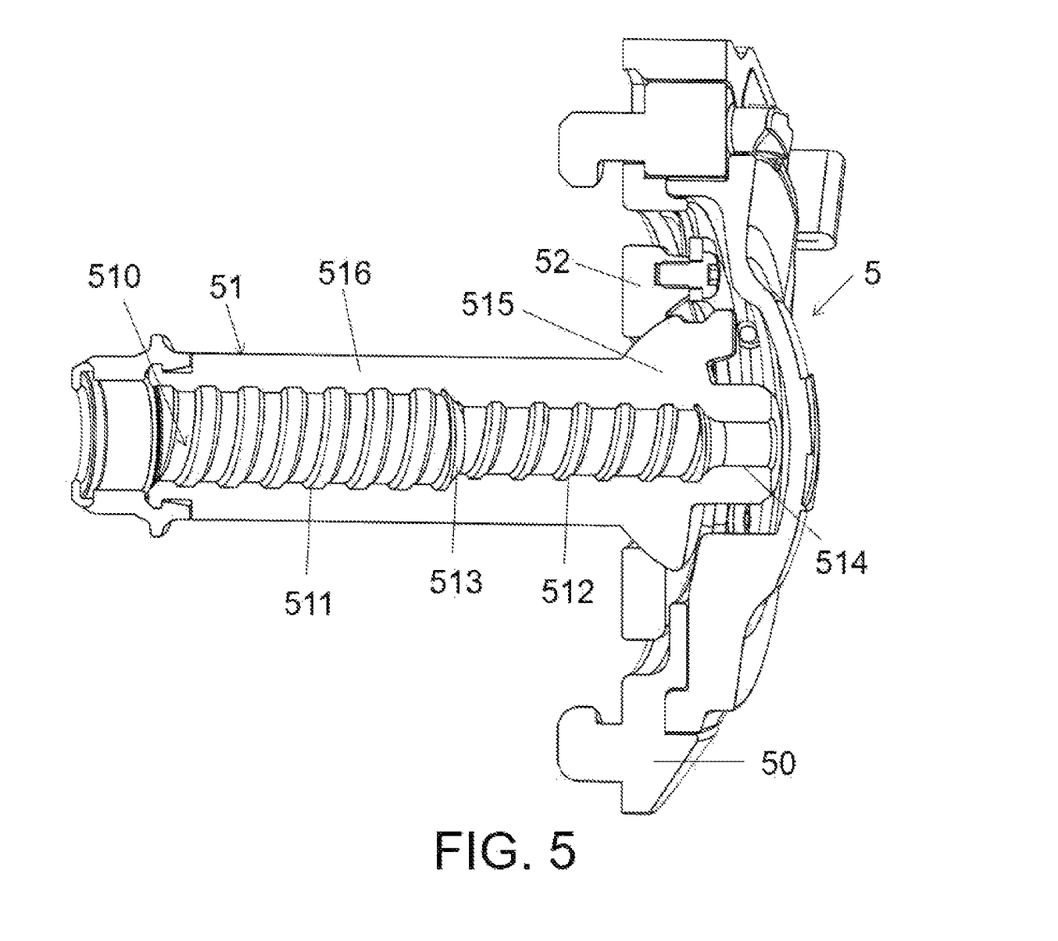
FIG. 5 shows a section view of the rear anchor of FIG. 4.
Figure 6:
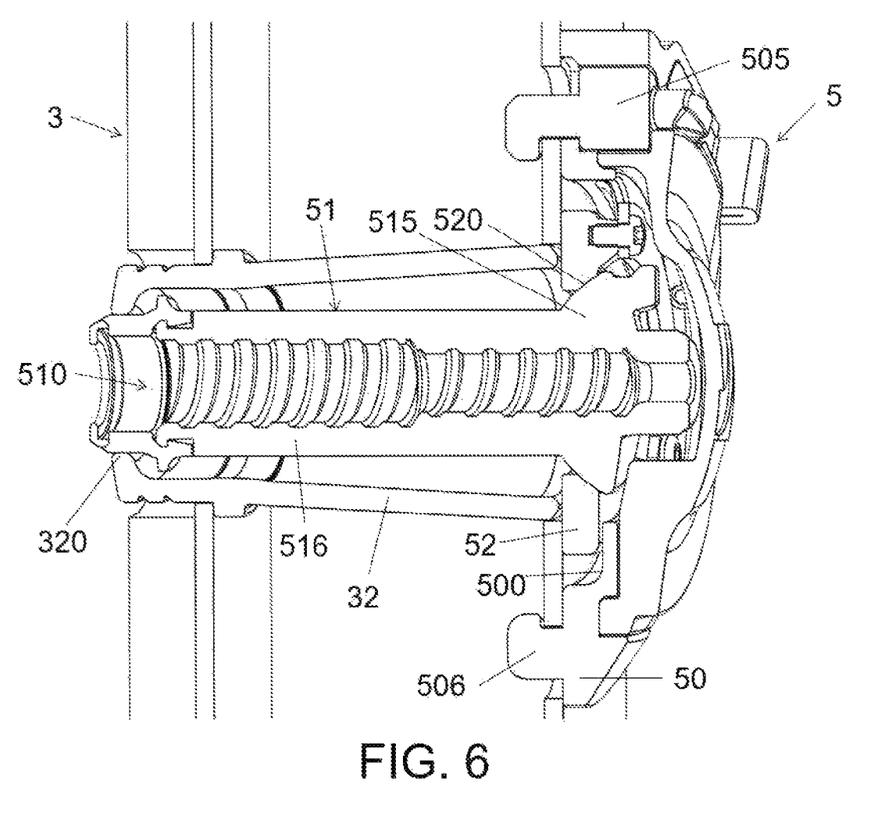
FIG. 6 shows a section view of the rear anchor of FIG. 4 when it is fixed to the rear formwork panel.

As mentioned above, the vertical formwork 1 comprises a rear anchor 5 suitable for being fixed to the rear formwork panel 3. FIGS. 4 to 6 show the rear anchor 5 in detail.

According to one embodiment, the rear anchor 5 comprises a support 50 configured for being fixed to the rear formwork panel 3 and a nut 51 coupled to said support 50 such that the nut 51 can be oriented with respect to said support 50.

The nut 51 comprises a threaded hole 510 configured for housing the threaded end 60 of a tie rod 6. Since the nut 51 can be oriented with respect to the support 50, when the operator wants to screw the threaded end 60 of the tie rod 6 into the threaded hole 510 of said nut 51, it can be done even though the exit opening 220 of the bushing 22 of the front formwork panel 2 and the exit opening 320 of the bushing 32 of the rear panel 3 are not perfectly aligned.

Figure 9:
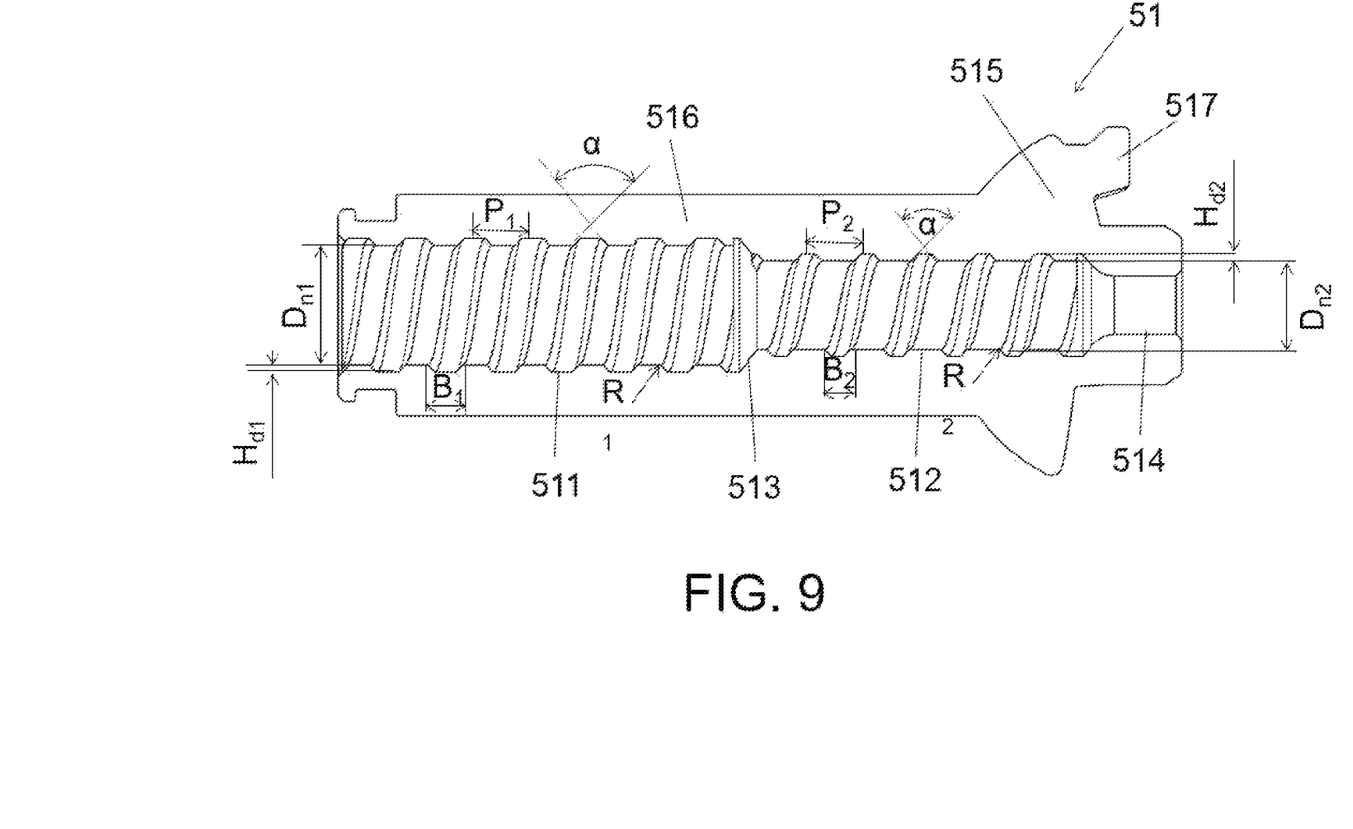
FIG. 9 shows a section view of the nut of the rear anchor of FIG. 4.

The threaded hole 510 of the nut 51 comprises a first segment 511 with an internal thread with a first core diameter Dn1, and a second segment 512 with an internal thread with a second core diameter Dn2, the first core diameter Dn1 being greater than the second core diameter Dn2. As seen in FIG. 9, core diameter is considered the diameter of the thread without taking into account the height of the teeth of said thread.

The rear anchor 5 is configured such that when it is fixed to the rear formwork panel 3, the first segment 511 of the threaded hole 510 is arranged closer to the exit opening 320 of the bushing 32, i.e., to the inner face 33 of the rear formwork panel 3, than the second segment 512 of the threaded hole 510.

Figure 7:
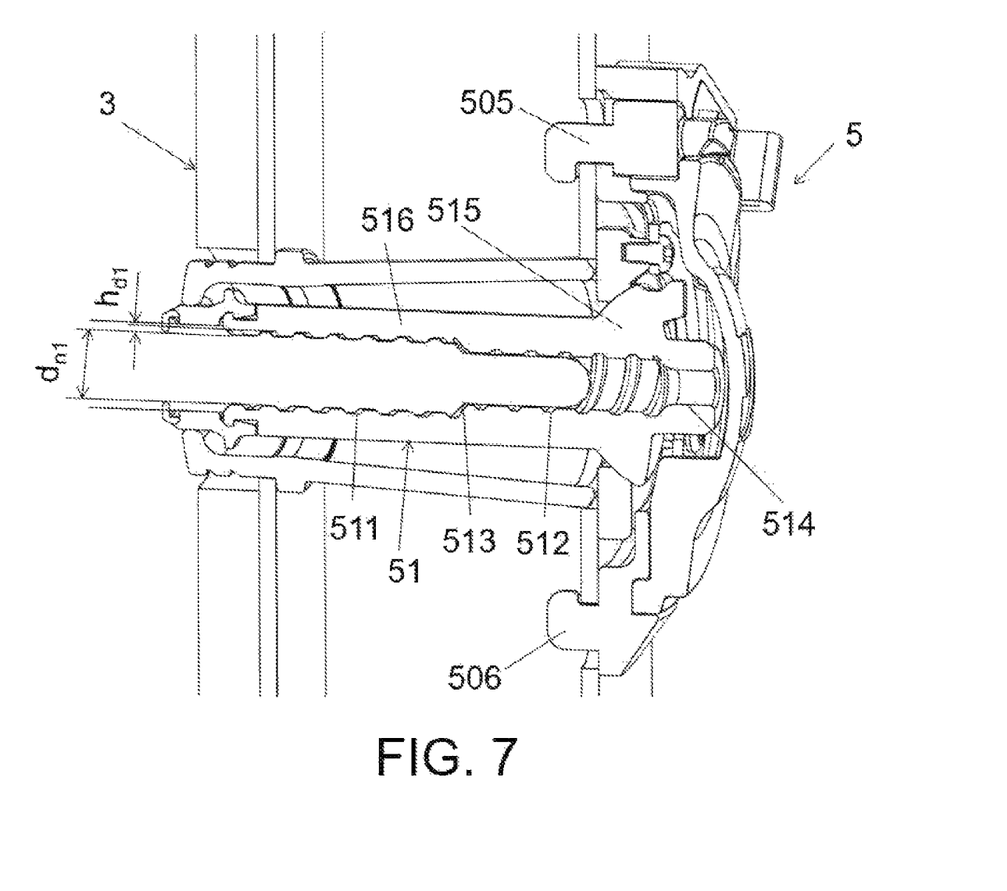
FIG. 7 shows a section view of the rear anchor of FIG. 4 fixed to the rear formwork panel and with the threaded end of a tie rod screwed into the first segment of the threaded hole of the nut of the rear anchor.
Figure 8:
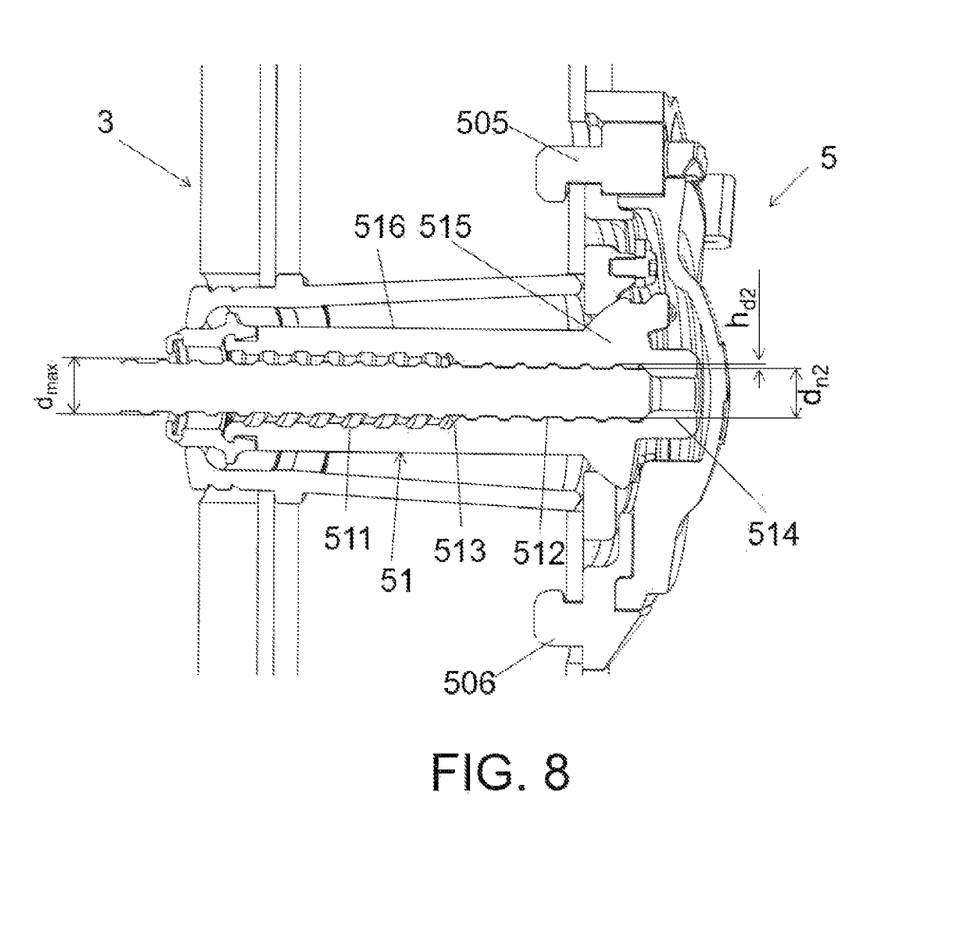
FIG. 8 shows a section view of the rear anchor of FIG. 4 fixed to the rear formwork panel and with the threaded end of a tie rod screwed into the second segment of the threaded hole of the nut of the rear anchor.

Therefore, if the tie rod 6 to be screwed in has a threaded end 60 with an external thread configured for being screwed into the internal thread of the first segment 511, the operator will screw it into the first segment 511 of the threaded hole 510. If, on contrast, the tie rod 6 to be screwed in has a threaded end 60 with an external thread configured for being screwed into the internal thread of the second segment 512, said threaded end 60 of the tie rod 6 will go through the first segment 511 of the threaded hole 510 and the operator will screw it into the second segment 512 of the threaded hole 510. Therefore, an operator working from the front portion of the vertical formwork 1 can fix in the threaded hole 510 of the nut 51 of the rear anchor 5 both a tie rod 6 with a threaded end 60 the external thread of which is configured for cooperating with the internal thread of the first segment, as well as a tie rod 6 with a threaded end 60 the external thread of which is configured for cooperating with the internal thread of the second segment.

Preferably the second segment 512 of the threaded hole 510 is configured for fixing the threaded end 60 of a tie rod 6 with an external thread having a core diameter dn2 of about 14.8 millimeters and a tooth height hd2 of about 1 millimeter. More preferably, in addition to the aforementioned dimensions, the second segment 512 of the threaded hole 510 is configured for fixing the threaded end 60 of a tie rod 6 with an external thread in which the width of the base of the tooth is about 4.5 millimeters, the radius of the base of the tooth with the core is about 1.5 millimeters, the inclined walls of the tooth form an angle of about 90 degrees and the pitch between teeth is 10 millimeters. This type of external thread corresponds with the dimensions of the external thread of a type of tie rod commonly used in vertical formworks, and even though it does not comply with metric screw thread standards, it has become a standard in the field of construction. Threaded tie rods with an external thread with these features are known as Dywidag® 15 ties or DW15 ties. Therefore, the internal thread of the second segment 512 according to the preferred embodiment of the invention is configured for housing the threaded end 60 of a tie rod 6 with the features of the external thread of a Dywidag® 15 tie. To that end, the internal thread of the second segment 512 has to have a core diameter Dn2 of about 15.25 millimeters and a tooth height Hd2 of about 1.25 millimeters. Furthermore, the width of the base of the tooth B2 is about 4.5 millimeters, the radius R2 of the base of the tooth with the core is about 1.5 millimeters, the inclined walls of the tooth form an angle α of about 90 degrees and the pitch P2 between teeth is 10 millimeters. All these contour heights have a tolerance of ±3%.

In addition to complying with the condition that the first core diameter Dn1 is greater than the second core diameter Dn2, in order for the threaded end 60 of a tie rod 6 with an external thread configured for cooperating with the internal thread of the second segment 512 to be able to go through the first segment 511 of the threaded hole, the core diameter Dn1 of the first segment 511 of the threaded hole 510 has to be greater than the maximum diameter dmax of the threaded end 60 configured for cooperating with the internal thread of the second segment 512. As shown in FIG. 8, the maximum diameter dmax of the threaded end is defined by the sum of the core diameter dn2 and the height of the tooth hd2 multiplied by two. Therefore, in order for the threaded end 60 of a tie rod 6 with an external thread configured for being screwed into the internal thread of the second segment 512 to be able to go through the first segment 511 of the threaded hole 510, the following condition must be met:

$$Dn_1 > dn_2 + hn_2*2$$

Therefore, preferably the core diameter Dn1 of the internal thread of the first segment should be greater than about 17.3 millimeters, with a tolerance of ±3%, in order for the threaded end 60 of a tie rod 6 with an external thread like the one described above to be able to go through the first segment 511 of the threaded hole 510.

More preferably, the first segment 511 of the threaded hole 510 is configured for screwing in the threaded end 60 of a tie rod 6 with an external thread having a core diameter dn1 of about 19.9 millimeters and a tooth height hd1 of about 1.2 millimeters. More preferably, in addition to the aforementioned dimensions, the first segment 511 of the threaded hole 510 is configured for fixing the threaded end 60 of a tie rod 6 with an external thread in which the width of the base of the tooth is about 4.8 millimeters, the radius of the base of the tooth with the core is about 2 millimeters, the inclined walls of the tooth form an angle of about 90 degrees and the pitch between teeth is about 10 millimeters. This external thread corresponds with the dimensions of the external thread of a type of tie rod used in vertical formworks, although to a lesser extent than the external thread type described above. Like in the preceding case, even though metric screw thread standards are not complied with, it has become a standard in the field of construction. Threaded tie rods with an external thread with these features are known as Dywidag® 20 ties or DW20 ties. Therefore, the internal thread of the first segment 511 in a preferred embodiment is configured for housing the threaded end 60 of a tie rod 6 with the features of the external thread of a Dywidag® 20 tie. To that end, the internal thread of the first segment 511 has to have a core diameter Dn1 of about 20.5 millimeters and a tooth height Hd1 of about 1.4 millimeters. Furthermore, the width of the base of the tooth B1 is about 4.8 millimeters, the radius R1 of the base of the tooth with the core is about 2 millimeters, the inclined walls of the tooth form an angle α of about 90 degrees and the pitch P1 between teeth is about 10 millimeters. All these contour heights have a tolerance of ±3%.

Historically, the most widely used tie rods in conventional vertical formworks for being adjusted from two faces have been Dywidag® 15 ties and Dywidag® 20 ties, choosing one or the other depending on the maximum tensile force it must withstand. A vertical formwork for being adjusted from two faces comprises two formwork panels arranged facing and fixed to one another by means of a tie rod (usually a Dywidag® 15 tie or a Dywidag® 20 tie), the tie rod being fixed to the formwork panels by means of an anchor fixed to the respective formwork panel. A spacing tube, generally made of plastic, is arranged between formwork panels in order to remove the tie rod once the concrete has set. In vertical formworks of this type, one operator must be located each side of the formwork in order to assemble said formwork.

The use of vertical formworks for being adjusted from one face in which the rear anchor is fixed to the formwork panel before arranging the formwork panels in the concreting position has started up in recent years, such that once the panels are arranged in the concreting position, a single operator can fix a threaded end of a tie rod in the threaded hole of the rear anchor from the front portion. Among the vertical formworks for being adjusted from one face stand out the vertical formwork for being adjusted from one face with a tapered tie rod (like the vertical formwork shown in FIGS. 1 to 3) and the vertical formwork for being adjusted from one face with a conventional tie rod and a spacing tube.

Among those vertical formworks for being adjusted from one face with a tapered tie rod, most of them use a tie rod with a smooth frustoconical central portion having a threaded end the thread of which complies with the requirements for Dywidag® 20 ties.

In addition, there are systems for being adjusted from one face in which both the tie rod and the spacing tube are introduced from the bushing of the front panel. In general, the tie rods of systems of this type have a threaded end that complies with the features of the Dywidag® 15 or Dywidag® 20 tie.

Furthermore, even though a specific type of vertical formwork for being adjusted from one face is being used, operators at construction jobs often have to use particular solutions in the front portion of the formwork in some parts of said job, such as in corners, for example, or compensation segments in which a block of wood has to be arranged in order to fill a gap between two formwork panels. Dywidag® 15 ties are normally used in particular solutions of this type since they are the standard ties normally existing in all jobs.

With the rear anchors 5 disclosed herein, use of the same rear anchor 5 is enabled regardless of the configuration to be used in the front portion of the formwork, since the rear formwork 5 can interchangeably fix the threaded end 60 of a tie rod 6 both with Dywidag® 15 features and with Dywidag® 20 features.

The operator can thereby fix the rear anchors 5 on the rear panels 3 regardless of the configuration to be used in the front portion, since the rear anchor 5 is common for all them. Therefore, in addition to providing flexibility, the number of required parts is reduced, as the rear anchor 5 is common for different systems, so rear anchors 5 need not be duplicated for each type of formwork.

In this embodiment, a funnel-shaped intermediate segment 513 is arranged between the first segment 511 and the second segment 512 of the threaded hole 510. Said intermediate segment 513 allows guiding the tip of the threaded end 60 of the tie rod 6 with an external thread configured for cooperating with the internal thread of the second segment 512 towards said second segment 512. Furthermore, since the diameter of the intermediate segment 513 is less than the core diameter Dn1 of the first segment 511, it functions as a stop for the first segment 511, such that when the operator is screwing the threaded end 60 of a tie rod 6 into the first segment 511 of the threaded hole 510, since the end of the thread of the threaded end 60 reaches the intermediate segment 513 and the tie rod 6 can no longer be screwed in, the operator knows that the threaded end 60 has been screwed in up to the end thereof.

In this embodiment, the threaded hole 510 comprises a stop segment 514 after the second segment 512, the diameter of the stop segment 512 being less than the core diameter Dn2 of the second segment 512, so it acts as a stop for the second segment 512. Therefore, when the operator is screwing the threaded end 60 of a tie rod 6 into the second segment 512 of the threaded hole 510, since the end of the thread of the threaded end 60 reaches the stop segment 514 and the tie rod 6 can no longer be screwed in, the operator knows that the threaded end 60 has been screwed in up to the end thereof.

Preferably both the first segment 511 of the threaded hole 510 and the second segment 512 of the threaded hole 510 comprise at least four turns of the nut. The number of turns of the nut is determined by contraction forces the anchor must withstand, as well as by the material from which it is made and the thickness thereof.

The rear anchor 5 of this embodiment comprises a dome plate 52 comprising a spherical-shaped central section 520, said central section 520 comprising an opening. The nut 51 comprises a spherical portion 515 which is arranged in the opening of the dome plate 52. The spherical portion 515 of the nut 51 and the central section 520 of the dome plate 52 are coupled like a ball and socket joint. Furthermore, the support 50 comprises a housing 500 in which the dome plate 52 is arranged, the dome plate 52 having freedom of radial movement with respect to the support 50 inside the housing 500.

The ball and socket joint-like coupling between the spherical portion 515 of the nut 51 and the central section 520 of the dome plate 52, and the radial movement of the dome plate 52 with respect to the support plate 50, allows orienting the nut 51 with respect to the rear formwork panel 3. Therefore, when the operator has to screw the threaded end 60 of a tie rod 6 into the threaded hole 510 of the nut 51, it can be done even though the exit opening 220 of the bushing 22 of the front formwork panel 2 and the exit opening 320 of the bushing 32 of the rear panel 3 are not perfectly aligned. The nut 51 can therefore be adapted to the inclination of the tie rod 6.

The nut of this embodiment, shown in detail in FIG. 9, comprises a tubular portion 516, and a spherical portion 515 after a first end of said tubular portion 516. The second end of the tubular portion 516 is arranged in the proximity of the inner face 33 of the rear formwork panel 3 when the rear anchor 5 is fixed to the rear formwork panel 3. The tubular portion 516 of the nut 51 is housed in the bushing 32 of the rear formwork panel 3.

In this embodiment, the rear anchor 5 comprises a sealing element 55 which is arranged in the second end of the nut 51, said sealing element 55 sealing both the rear anchor 5 with respect to the rear formwork panel 3, and the rear anchor 5 with respect to the tie rod 6 housed in the threaded hole of the nut.

In this embodiment, the support 50 comprises a fixing system configured for fixing the rear anchor 5 to the rear formwork panel 3. The fixing system comprises a fixing key 505 which is arranged in a housing of the support and a pin 506 projecting perpendicularly from the inner face of said support 50. The fixing key 505 and the pin 506 are housed in a respective hole of the structure 31 of the rear formwork panel 3.

In other possible embodiments, the configuration of the nut and the support may be otherwise provided that it allows orienting the nut with respect to the formwork panel.

The following clauses represent example embodiments.

Clause 1: A vertical formwork comprising at least one front formwork panel (2) and one rear formwork panel (3) which are arranged facing one another, one rear anchor (5) fixed to the rear formwork panel (3), one front anchor (4) fixed to the front formwork panel (2), and
one tie rod (6) fixed to the front anchor (4) and to the rear anchor (5), the rear anchor (5) comprising
a support (50) configured for being fixed to the rear formwork panel (3), and
a nut (51) coupled to said support (50) such that the nut (51) can be oriented with respect to said support (50), the nut (51) comprising a threaded hole (510) configured for housing the threaded end (60) of the tie rod (6),
the threaded hole (510) of the nut (51) of the rear anchor (5) comprises a first segment (511) with an internal thread with a first core diameter ($Dn_1$) and a second segment (512) with an internal thread with a second core diameter ($Dn_2$), the first core diameter ($Dn_1$) being greater than the second core diameter ($Dn_2$), and
the tie rod (6) is selected from
a first type of tie rod (6) with a threaded end (60) with an external thread configured for being fixed to the first segment (511) of the threaded hole (510), said tie rod (6) of the first type being screwed into the internal thread of the first segment (511), and
a second type of tie rod (6) with a threaded end (60) with an external thread configured for being fixed to the second segment (512) of the threaded hole (510), said tie rod (6) of the second type going through the first segment (511) and being screwed into the internal thread of the second segment (512).

Clause 2: The vertical formwork according to claim 1, wherein the internal thread of the second segment (512) of the threaded hole (510) of the nut (51) of the rear anchor (5) is configured for housing the threaded end (60) of a tie rod (6) with an external thread with a core diameter of about 14.8 millimeters.

Clause 3: The vertical formwork according to claim 1 or 2, wherein the internal thread of the first segment (511) of the threaded hole (510) of the nut (51) of the rear anchor (5) has a core diameter (Dn1) equal to or greater than about 17.3 millimeters.

Clause 4: The vertical formwork according to claim 3, wherein the internal thread of the first segment (511) is configured for housing the threaded end (60) of a tie rod (6) with an external thread with a core diameter of about 19.9 millimeters.

Clause 5: The vertical formwork according to any of the preceding claims, wherein a funnel-shaped intermediate segment (513) is arranged between the first segment (511) and the second segment (512) of the threaded hole (510) of the nut (51) of the rear anchor (5).

Clause 6: The vertical formwork according to any of the preceding claims, wherein the threaded hole (510) of the nut (51) of the rear anchor (5) comprises a stop segment (514) after the second segment (512), the diameter of the stop segment being less than the core diameter (Dn2) of the second segment (512).

Clause 7: The vertical formwork according to any of the preceding claims, wherein both the first segment (511) of the threaded hole (510) and the second segment (512) of the threaded hole (510) comprise at least four turns of the nut.

What is claimed is:

1. A vertical formwork comprising:
a front formwork panel,
a rear formwork panel arranged facing the front formwork panel,
a rear anchor fixed to the rear formwork panel,
a front anchor fixed to the front formwork panel,
a tie rod having a first end section fixed to the front anchor and a second external threaded end section fixed to the rear anchor,
the rear anchor comprising:
a support configured to be fixed to the rear formwork panel, and
a nut coupled to the support in a manner that permits the nut to assume different orientations with respect to the support, the nut including a threaded hole configured to house the second external threaded end section of the tie rod, the threaded hole having a first segment with a first internal thread with a first core diameter and a second segment with a second internal thread with a second core diameter, the first core diameter being greater than the second core diameter, the tie rod being selected from the group consisting of:
a first type of tie rod having the second external threaded end section of a first diameter that is configured to be screwed into the first segment of the nut to mate with the first internal thread and;
a second type of tie rod having the second external threaded end section of a second diameter less than the first diameter that is configured to be screwed into the second segment of the nut to mate with the second internal thread with a portion of the tie rod passing through the first segment of the threaded hole of the nut.

2. The vertical formwork according to claim 1, wherein when the second external threaded end section of the first type of tie rod is housed inside the threaded hole of the nut, no portion of the tie rod extends into the second segment of the threaded hole.

3. The vertical formwork according to claim 1, wherein when the second threaded end section of the second type of tie rod is housed inside the nut, the portion of the tie rod extending through the first segment of the threaded hole does not mate with the first internal thread.

4. The vertical formwork according to claim 1, wherein the second internal thread of the second segment of the threaded hole of the nut of the rear anchor is configured to mate with the second external threaded end section of the tie rod with an external thread with a core diameter of about 14.8 millimeters.

5. The vertical formwork according to claim 1, wherein the first core diameter of the first internal thread of the first segment of the threaded hole of the nut of the rear anchor is equal to or greater than 17.3 millimeters.

6. The vertical formwork according to claim 4, wherein the first core diameter of the first internal thread of the first segment of the threaded hole of the nut of the rear anchor is 17.3 millimeters ±3%.

7. The vertical formwork according to claim 3, wherein the first internal thread of the first segment of the threaded hole is configured to mate with the second external threaded end section of the tie rod with an external thread with a core diameter of 19.9 millimeters.

8. The vertical formwork according claim 1, wherein a funnel-shaped intermediate segment is arranged between the first segment and the second segment of the threaded hole of the nut of the rear anchor.

9. The vertical formwork according to claim 1, wherein the threaded hole of the nut of the rear anchor comprises a stop segment after the second segment, the stop segment having a diameter less than the second core diameter of the second segment.

10. The vertical formwork according to claim 8, wherein the threaded hole of the nut of the rear anchor comprises a stop segment after the second segment, the stop segment having a diameter less than the second core diameter of the second segment.

11. The vertical formwork according to claim 1, wherein the first threads of the first segment of the threaded hole and the second threads of the second segment of the threaded hole each comprises at least four turns.

12. The vertical formwork according to claim 1, wherein the nut is a unitary structure made from a single piece of material.

13. The vertical formwork according to claim 8, wherein the funnel-shaped intermediate segment has a diameter less than the first core diameter and functions as a stop for the first segment.

14. The vertical formwork according to claim 1, wherein the rear anchor further comprises a dome plate that includes a spherical-shaped central section with an opening, the nut including a spherical portion that is arranged coupled to the dome plate inside the opening to form a ball and socket type joint between the dome plate and nut.

15. The vertical formwork according to claim 14, wherein the dome plate is at least partially housed inside a support attached to the rear formwork panel, the dome plate having a radial freedom of movement inside the support.

* * * * *